UNITED STATES PATENT OFFICE.

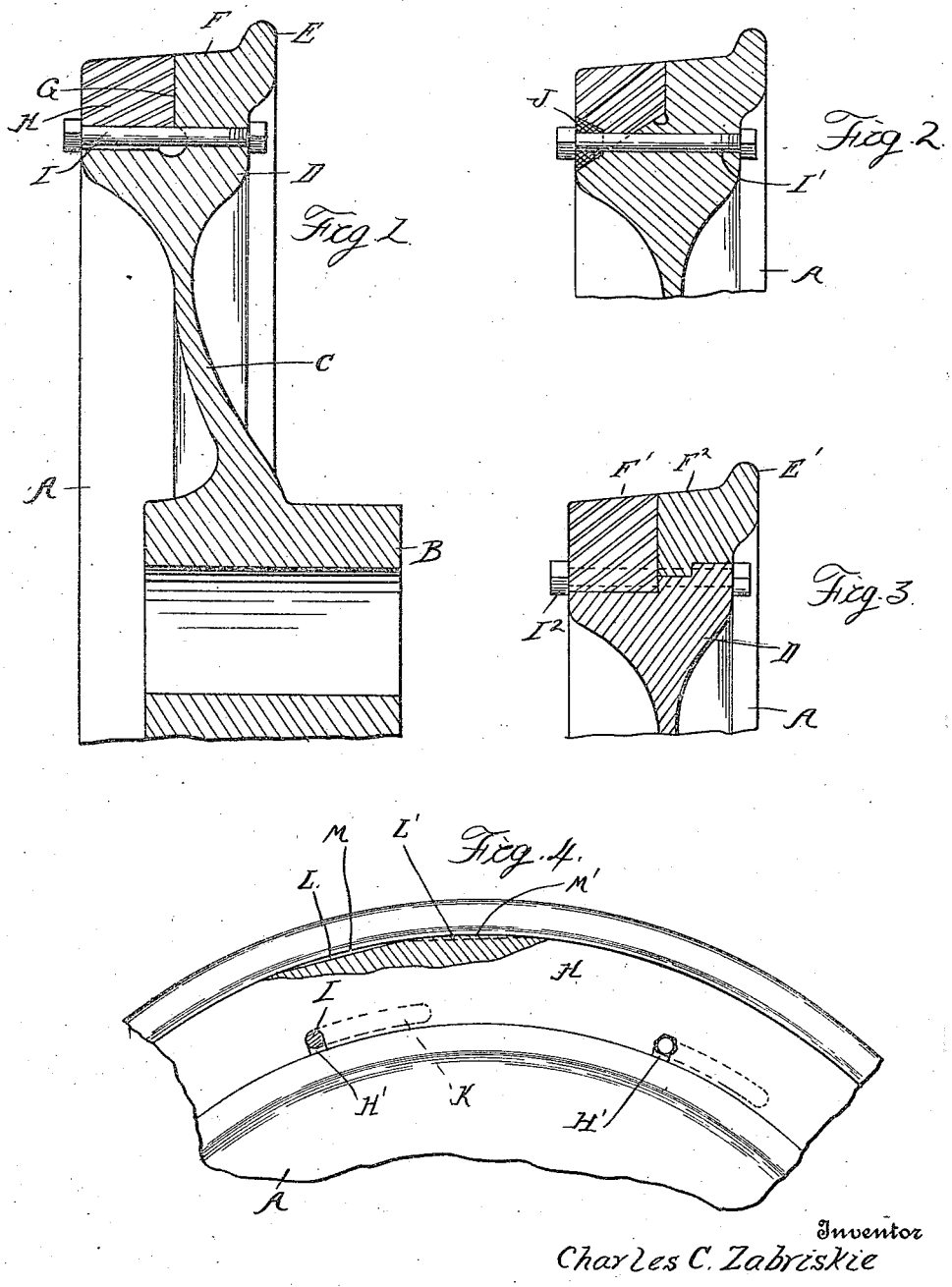

CHARLES C. ZABRISKIE, OF HIGHLAND PARK, MICHIGAN.

CAR WHEEL.

1,421,653.   Specification of Letters Patent.   Patented July 4, 1922.

Application filed May 27, 1921. Serial No. 473,116.

*To all whom it may concern:*

Be it known that I, CHARLES C. ZABRISKIE, a citizen of the United States of America, residing at Highland Park, in the county of Wayne and State of Michigan, have invented certain new and useful Improvements in Car Wheels, of which the following is a specification, reference being had therein to the accompanying drawings.

The invention relates to car wheels and has for its object the provision of means for quickly remedying a flat spot on the periphery of the wheel. To this end the invention consists in the construction as hereinafter set forth.

In the drawings:

Figure 1 is a section through a portion of the car wheel of the improved construction;

Figure 2 is a similar view of a modified construction;

Figure 3 shows a further modification;

Figure 4 is an elevation showing the wheel after adjustment to remedy a flat spot.

A is a car wheel having the usual integrally cast hub B, web C and rim D. It is usual to form the rim with an integral flange and tread portion for engaging the rail. The tread portion is chilled or otherwise hardened to resist wear, but it frequently happens that in application of the brakes, the wheel is held from revolving and the sliding over the rails will wear a flat spot. To correct this it is usually necessary to grind down the entire periphery of the wheel until the spot is removed.

With my improved construction instead of making the whole of the tread integral with the rim and flange, the tread is divided, one portion thereof being formed of a separate ring, which is rotatively adjustably secured to the rim. Thus, whenever a flat spot is worn, by rotatively adjusting the ring the spot thereon is moved out of registration with the spot on the integral portion of the rim, which will prevent the pounding of the wheel on the rail.

In detail and as shown in Figure 1, the rim D is formed with the flange E integral therewith and also a portion F of the tread. Adjacent to this portion F is a rabbet G which is filled by the separate ring H. The ring H is clamped in position by a series of bolts I so that the surfaces of the ring and the tread portion F are complementary. The bolts I pass through channels H' in the ring H and whenever a flat spot is worn upon the tread, by removing the bolts the ring may be adjusted by a space equal to the distance between bolts and again clamped. This will restore a circular periphery and if another flat spot is worn, further adjustment may be made, thereby greatly prolonging the life of the wheel.

In the construction shown in Figure 2, instead of passing the bolts I through the channels in the ring H, said ring is frictionally clamped by a bevelled ring J through which the bolts I' pass. This will avoid the necessity of removing the bolts, it being only necessary to loosen the same and then to slide the ring H rotatively.

In Figure 3 there is shown a construction in which both sections of the tread F' and F², as well as the flange E', are made of rings separate from the rim D and are simultaneously clamped thereto by the bolts I².

In Figure 4 slots K, shown in dotted line, are formed in the integral rim portion and permit of rotative adjustment without removal of the bolts. In this same Figure, which is partly in section, is shown the flat spots L and L' which have been moved out of registration so that circular segments M and M' are opposite the same.

What I claim as my invention is:

1. In a vehicle wheel, the combination with a rim having a tread portion, and a ring forming a complementary tread portion rotatively adjustable to throw out of registration any flat spots therein.

2. In a vehicle wheel, the combination with a rim, of relatively rotatively adjustable tread sections for said rim.

3. In a vehicle wheel, the combination with a rim having a tread section integral therewith, of a ring forming a complementary tread section rotatively adjustably secured in relation to said integral section.

4. In a vehicle wheel, the combination with a rim having an integral flange and tread portion, of a ring forming a complementary tread portion, and means for clamping said ring to said rim permitting of rotative adjustment.

5. In a vehicle wheel, the combination with a rim having an integral flange and tread portion, and a rabbet adjacent to said tread portion, of a ring engaging said rabbet and forming a complementary tread portion rotatively adjustable in relation to said integral portion, and clamping means for said ring.

6. In a vehicle wheel, the combination with a rim having an integral flange and tread portion with a rabbet adjacent to said tread portion, a ring arranged in said rabbet and forming a complementary tread portion, and clamping bolts engaging channels in said ring and registering apertures in said rim, said bolts being removable to permit the rotative adjustment of said ring.

In testimony whereof I affix my signature.

CHARLES C. ZABRISKIE.